United States Patent [19]
Lee

[11] Patent Number: 5,845,023
[45] Date of Patent: Dec. 1, 1998

[54] OPTICAL COUPLING SYSTEM

[75] Inventor: Ho-Shang Lee, El Sobrante, Calif.

[73] Assignee: Dicon Fiberoptics, Inc., Berkeley, Calif.

[21] Appl. No.: 800,040

[22] Filed: Feb. 14, 1997

[51] Int. Cl.$^6$ ........................................... G02B 6/32
[52] U.S. Cl. .......................... 385/33; 385/34; 385/47; 385/48
[58] Field of Search ................ 385/24, 31, 33, 385/34, 47, 48; 359/652–654

[56] References Cited

U.S. PATENT DOCUMENTS

| | | | |
|---|---|---|---|
| 4,208,094 | 6/1980 | Tomlinson, III et al. | 385/16 |
| 4,474,424 | 10/1984 | Wagner | 385/24 |
| 5,062,686 | 11/1991 | Barrow et al. | 385/33 |
| 5,076,672 | 12/1991 | Tsuda et al. | 359/244 |
| 5,181,264 | 1/1993 | Chiaretti et al. | 385/33 |
| 5,399,876 | 3/1995 | LaClair | 250/577 |
| 5,539,577 | 7/1996 | Si et al. | 385/31 |
| 5,642,448 | 6/1997 | Pan et al. | 385/34 |
| 5,692,081 | 11/1997 | Takahashi | 385/78 |

OTHER PUBLICATIONS

H. A. Macleod, *Thin–Film Optical Filters*, 2nd Edition, McGraw–Hill Publishing Company, 1989, Chapter 2, pp. 11–27.

Diagram of Optical Glasses produced by Schott Glass Technologies, Inc., printed in Federal Republic of Germany, 1987, 3 pages.

*Primary Examiner*—Hemang Sanghavi
*Attorney, Agent, or Firm*—Majestic, Parsons, Siebert & Hsue P.C.

[57] ABSTRACT

An optical coupler is formed by a GRIN lens having an axis and an optical medium contiguous to the GRIN lens but having an index of refraction that is different from that of the lens. An input optical fiber carries an input optical signal along a path substantially parallel to the axis of the lens but is offset from its axis. The lens collimates the input optical signal into a beam that impinges on the interface between the lens and the optical medium at a small angle. Fresnel reflection of the collimated beam at such interface is focused by lens to an output optical path also substantially parallel to the axis of the lens but at the same offset to the axis from the input optical path. The tapping percentage can be controlled by choosing an optical medium having the desired index of refraction. Additional interfaces can be formed between the optical medium and additional media, such as a thin glass disk for additional Fresnel reflections that are also coupled to the same output fiber. Such additional interfaces can be used to increase the tapping percentage.

13 Claims, 3 Drawing Sheets

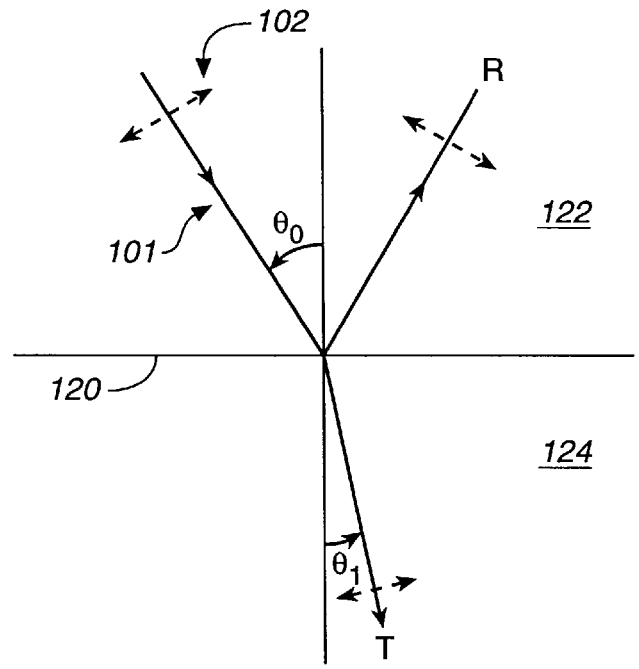
FIG._1A
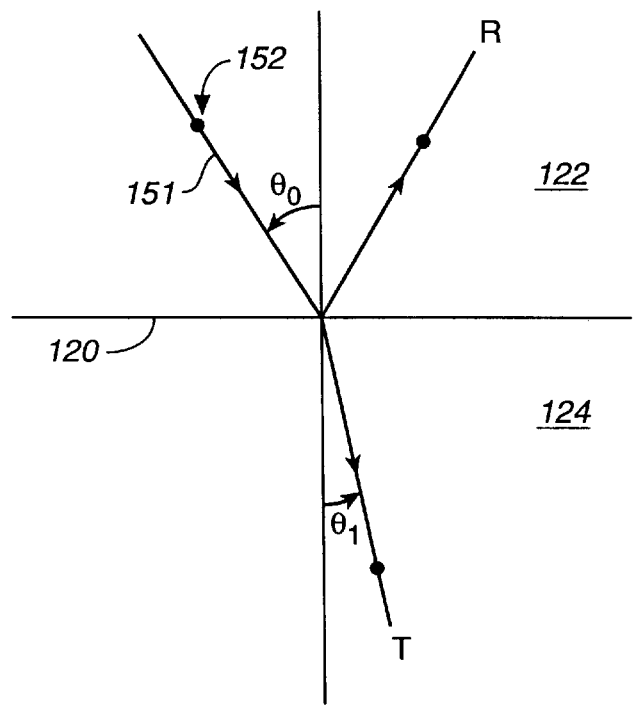
FIG._1B

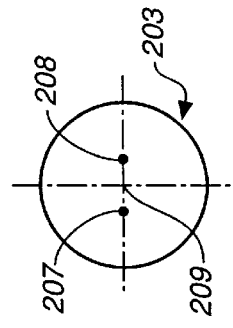
FIG._2B
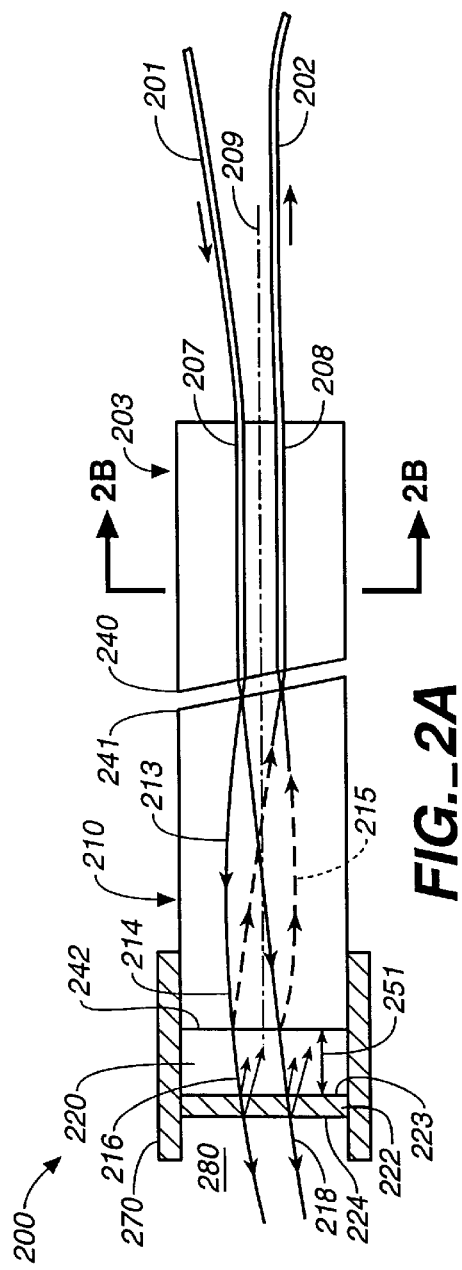
FIG._2A
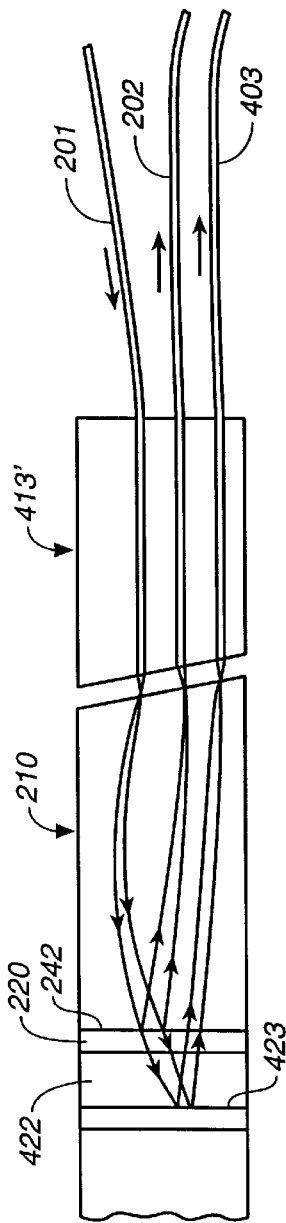
FIG._4

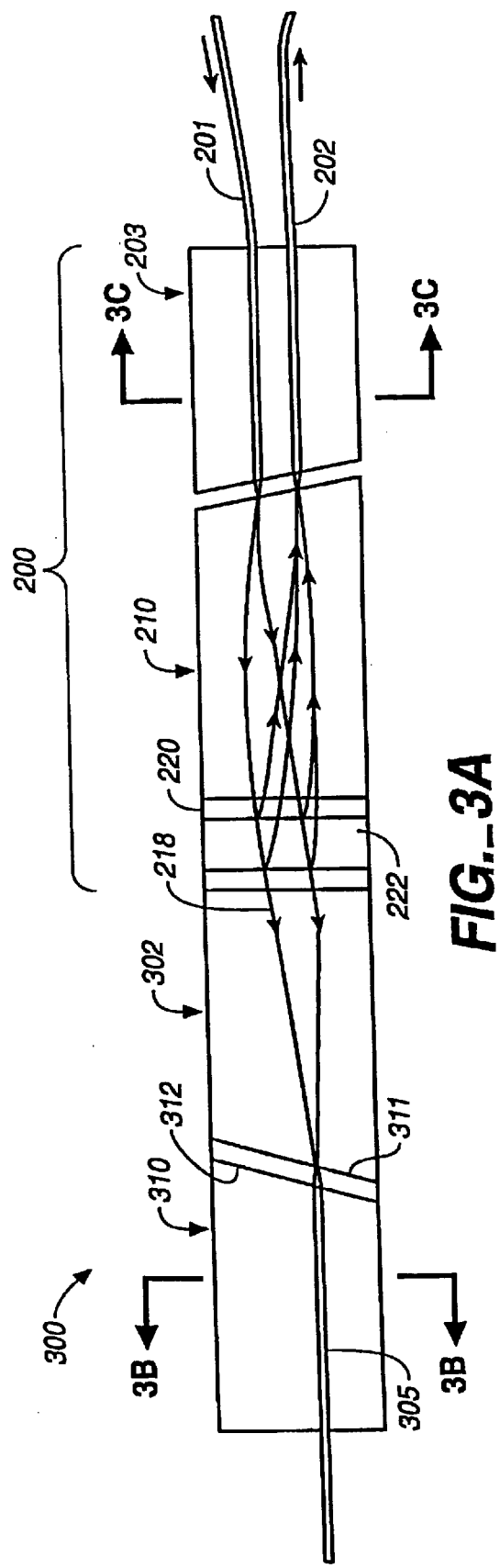
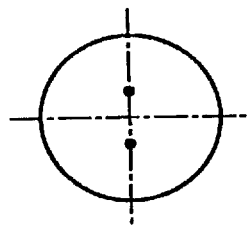
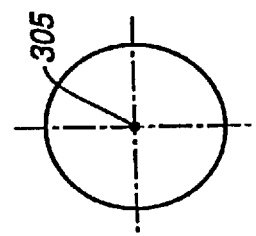

OPTICAL COUPLING SYSTEM

BACKGROUND OF THE INVENTION

This invention relates in general to optical communication systems and in particular to an optical coupler useful for optical monitoring.

In optical fiber communication, optical signals are transmitted through optical fibers. To monitor the signal level or the conditions of the transmission, it is often necessary to tap a small amount of light from the main line. The conventional scheme for tapping is achieved by inserting an optical coating film in the main optical path. The coating film will reflect a small amount of the light being transmitted in the forward direction in the main path, while leaving most of the light transmitted in the main path for communication purposes. This small amount of light that is reflected by the optical coating film is then collected and analyzed in order to monitor the signal level or the conditions of transmission of the optical communication line. The above described conventional method for tapping is disadvantageous because optical coating films are strongly wavelength dependent.

The percentage of light reflected by the coating depends on the wavelength of the light that is being transmitted. If the optical coating film is designed to tap 2% of the light in the main line at a particular wavelength, and if the wavelength of the light actually being transmitted is different from that for which the coating film was designed, the amount of light actually tapped may be much weaker or much stronger than 2%. If the amount tapped has fallen very low, the amount of light tapped may be too weak for accurate monitoring. On the other hand, if the amount of light tapped is significantly greater than 2%, this means that the intensity of light passing in the main line used for optical communication has suffered an unpredictable and significant loss in intensity, which is undesirable. Other types of tapping devices include the fused biconical coupler. Again, the fused biconical coupler is also wavelength dependent and has a useful operating wavelength range of typically only 30 nanometers. This means that if a conventional device is used for optical tapping, in order to monitor the signal level or conditions of transmission, only light of the particular wavelength for which the tapping is designed can be used. It is therefore desirable to provide an improved optical coupling system which is substantially wavelength independent and which can be used to achieve the desired percentage of light being tapped from the main line, or the tapping percentage.

SUMMARY OF THE INVENTION

One aspect of the invention is directed towards an optical coupler comprising a GRIN lens having an axis, a first optical medium adjacent to a surface of the GRIN lens, said first medium having an index of refraction that is different than that of the GRIN lens, so that a first interface is formed between the lens and said first medium. The coupler further comprises an input optical path substantially parallel to said axis and incident on the GRIN lens at a distance from the axis, said path carrying an input optical signal, said lens transmitting the input optical signal in the input path towards the first interface, so that a portion of the input optical signal is reflected through Fresnel reflection by the first interface and another portion thereof is transmitted therethrough. The optical coupler further includes a first output optical path receiving the portion of the light reflected by the first interface and a second output optical path receiving the portion of the light transmitted through the first interface or any portion thereof.

Another aspect of the invention is directed towards a method of optical coupling, comprising the steps of providing a GRIN lens having an axis, providing a first optical medium adjacent to a surface of the GRIN lens, said first medium having an index of refraction that is different from that of the GRIN lens, where a first interface is formed between said first medium and the lens. The method further comprises directing an input optical signal along an input optical path substantially parallel to said axis and incident on the GRIN lens at a distance from the axis, said lens transmitting the input optical signal towards the first interface, so that a portion of the input optical signal is reflected by the first interface and another portion thereof is transmitted therethrough. The method comprises additionally the steps of receiving the portion of the signal reflected by the first interface and receiving the portion of the signal transmitted through the first interface or any portion thereof.

BRIEF DESCRIPTION OF THE DRAWINGS

FIG. 1A is a schematic view illustrating the reflection and refraction at an interface between two media of different indices of refraction from a p-polarized incident beam.

FIG. 1B is a schematic view illustrating the reflection and refraction at an interface between two media of different indices of refraction from a s-polarized incident beam.

FIG. 2A is a cross-sectional view of an optical coupler to illustrate the invention.

FIG. 2B is a cross-sectional view across the line 2B—2B in FIG. 2A.

FIG. 3A is a cross-sectional view of an optical coupler to illustrate the preferred embodiment of the invention.

FIGS. 3B and 3C are cross-sectional views across the lines 3B—3B and 3C—3C respectively in FIG. 3A.

FIG. 4 is a cross-sectional view of a portion of an optical coupler to illustrate an alternative embodiment of the invention.

For convenience in description, identical components are referred to by the same numerals in this application.

DETAILED DESCRIPTION OF THE PREFERRED EMBODIMENT

FIG. 1A is a schematic view illustrating the reflection and refraction at an interface between a medium having an index of refraction $\eta_0$ and a second medium with an index of refraction $\eta_1$, from an incident beam 101. As shown in FIG. 1A, incident beam 101 is directed towards an interface 120 between medium 122 and medium 124 with indices of refraction $\eta_0$, $\eta_1$, respectively. The incident beam 101 is p-polarized where the electrical field 102 is in the incident plane of the beam 101 (plane of the paper) and perpendicular to the incident direction of the beam.

FIG. 1B is a schematic view illustrating the reflection and refraction at interface 120 between media 122, 124 of incident beam 151 which is s-polarized so that its electrical field 152 is normal to the incident plane (normal to the plane of the paper) and perpendicular to its incident direction. The indices of refraction experienced by beams 101, 151 are functions of the incident angle $\theta_0$ of incident beams 101, 151. Thus, if $\eta$ is the index or refraction of the medium, then the actual index of refraction experienced by the p-polarized beam 101 is $\eta/\cos\theta_0$ for the p-polarized beam 101 and $\eta\cdot\cos\theta_0$ for the s-polarized beam 151. Where the incident angle $\theta_0$ is small, this angle dependence of the index of refraction may be ignored. Hence, at small incident angles, the indices of refraction of media 122, 124 are $\eta_0$ and $\eta_1$, respectively and the reflectance and transmittance for the p-polarized and s-polarized beams 101, 151 are the same and are both given by equations 1 and 2 below.

$$R = \left(\frac{\eta_0 - \eta_1}{\eta_0 + \eta_1}\right)^2 \qquad \text{Equation 1}$$

$$T = \frac{4\eta_0\eta_1}{(\eta_0 + \eta_1)^2} \qquad \text{Equation 2}$$

The transmittance T and reflectance R in the equations 1 and 2 above are well known; see for example, "*Thin-Film Optical Filters*" by H. A. MacLeod from McGraw Hill Publishing Company, 2d ed., 1989, Chpt. 2, pp. 11–27.

In the above equations 1 and 2, the index of refraction is also a weak function of wavelength. In BK7 glass, for example, available from Schott Glass Technologies, Inc. of Duryea, Pa., the index of refraction of BK7 glass is 1.50094 at 1530 nm and 1.50981 at 852 nm. In other words, the reflectance R and transmittance T are also weak functions of the wavelength of incident beams 101, 151. Thus, even though different wavelengths, and as noted above, also the incident angle, may have small effects on transmittance and reflectance, such effects are small and do not significantly affect the operation of the invention for controlling the amount of reflectance R.

When an incident beam is directed towards an interface between two optical media having different indices of refraction, a portion of the beam is transmitted while another portion of the beam is reflected where such reflection is referred to as Fresnel reflection at the optical interface. This invention is based on the observation that Fresnel reflection at an optical interface may be used for tapping a percentage of light in order to monitor the signal level or conditions of transmission, where the tapping percentage may be controlled by controlling the indices of refraction of the two media forming the optical interface.

FIG. 2A is a cross-sectional view of an optical coupler 200 to illustrate the invention. As shown in FIG. 2A, optical fiber 201 carries an incoming input optical signal and optical fiber 202 carries the output optical signal used for tapping and monitoring signal level and conditions of transmission. Coupler 200 includes a ferrule 203 into which ends 207, 208 of fibers 201, 202 are imbedded and for aligning the ends of fibers 201 and 202 with other optical paths in the coupler. Coupler 200 also includes a GRIN lens 210 with axis 209. Ferrule 203 positions the fiber ends 207 and 208 with offsets to axis 209 as illustrated in FIG. 2B which is a cross-sectional view along the line 2B—2B in FIG. 2A. As shown in FIG. 2B, the optical fibers 207, 208 in ferrule 203 and the ferrule are positioned so that the axis 209 of lens 210 is preferably substantially at the mid-point between the fiber ends 207, 208.

The opposing surfaces 240, 241 of the ferrule and GRIN lens are slanted with respect to the fiber ends 207, 208 at an angle ranging from 4°–12° to reduce back reflection at surfaces 240, 241. Thus, the input optical signal carried in fiber 201 passes through end 207 and enters the GRIN lens 210. Due to a quasi-parabolic index distribution with a maximum index in the center of GRIN lens 210, the input optical signal in fiber 201 is transmitted through lens 210 to impinge the end surface 242 of lens 210 at a small angle, preferably ranging from 1°–30°. In the preferred embodiment, the length of the GRIN lens 210 is chosen to be close to a quarter pitch so that the input optical signal is collimated along path 213 to a parallel beam 214 as it exits the end surface 242 of the GRIN lens.

Contiguous to end surface 242 of the GRIN lens is medium 220 having an index or refraction that is different from that of the GRIN lens, so that Fresnel reflection occurs at interface between the GRIN lens and medium 220. The collimated reflection 215 which is independent of wavelength of the input signal at interface 242 is focused by lens 210 towards end 208 of output fiber 202. The reflectance R that is carried by fiber 202 is given by equation 1 where $\eta_0$ and $\eta_1$ are approximately the indices of refraction of the GRIN lens 210 and medium 220 respectively. Most of the input optical signal, however, exits end face 242 of the GRIN lens and through medium 220 as the transmitted beam 216 having a transmittance given approximately by equation 2 above. Thus, the reflectance R and transmittance T can be altered by choosing a medium 220 with the appropriate index of refraction.

Medium 220 may be a fluid such as air or liquid enclosed by a tubing 270 and the end face 242 of the GRIN lens. If desired, the amount of reflectance and transmittance may be changed by changing medium 220.

Another way to increase the reflectance collected by fiber 202 and increase the tapping percentage is by inserting an optically transparent material 222, such as one in the form of a disk, in a position contiguous to medium 220. Material 222 has surface 223 in contact with medium 220 and surface 224 facing away from the medium 220 and adjacent to medium 280. Material 222 has an index of refraction different from medium 220 so that Fresnel reflection occurs at an interface between 222 and medium 220. If the medium 280 in contact with surface 224 of material 222 also has an index of refraction that is different from material 222, Fresnel reflection will also take place at the interface between medium 280 and material 222. If the gap 251 between material 222 and surface 242 of the GRIN lens is small enough (i.e., medium 220 is thin enough) the reflectance at surface 223 will be coupled back through lens 210 to fiber 202. For this reason, it is preferable for gap 251 to be less than about 2 millimeters.

Furthermore, the Fresnel reflectance at interface 224 may also be coupled back to fiber end 208 if the combined thickness of medium 220 and disk material 222 is small enough. For convenient replacement of the disk 222, medium 220 may comprise optical cement or epoxy. Tubing 270 is then no longer necessary, and a disk 222 having the selected index of refraction may be placed in contact with the cement or epoxy 220 to yield the desired reflectance and tapping percentage.

In one embodiment, medium 222 is optical cement and material 222 is SF58 glass from The Schott Glass Technologies, Inc. and the indices of refraction of the relevant materials are given below:

Index of Cement=1.56

Index of GRIN Lens=1.63

Index of SF58 Glass in Material 222=1.90

The respective reflectances at the cement/glass interface (220/222) and the GRIN lens and cement interface (210/222) are 0.96% and 0.04% respectively according to equation 1 above. With the above materials, the reflectance at the interface of the cement and GRIN lens is negligible compared to that at the cement/glass interface. Hence, by choosing a medium 220 and material 222 having selected different indices of refraction, the total Fresnel reflection that is coupled back to fiber end 208 and fiber 202 can be easily altered.

In some cases, the interference of two reflections from interfaces at 223 and 224 is undesirable since this may cause fluctuation in power coupling to fiber 202. In such event, interface 224 can be slanted or coated with an anti-reflection film to reduce the interference of the reflections at the two surfaces of the material 222.

FIG. 3A is a cross-sectional view of an optical coupler to illustrate the preferred embodiment of the invention. Coupler 300 includes as its front portion, optical coupler 200 shown in FIG. 2A, and in addition a second GRIN lens 302 to focus the transmitted beam 218 to the fiber end 305 of an output optical fiber embedded in a ferrule 310. Optical alignment between the ferrule 310 and GRIN lens 302 is necessary for the optimal optical coupling therebetween. Optical cement can be used to bond the surface 312 of the ferrule 310 to the surface 311 of the GRIN lens 302. Anti-reflection coating (AR coating) can be applied to surfaces 311, 312 to reduce undesirable reflections and an air cap is kept between the two surfaces. FIGS. 3B and 3C are cross-sectional views of the coupler in FIG. 3A along lines 3B—3B, 3C—3C in FIG. 3A.

In the embodiments above, the reflections at different interfaces which are independent of wavelength of the input signal are coupled to the same output fiber. This is, however, not required and reflections at different interfaces may be coupled to different output fibers in the manner shown in FIG. 4. The optical coupler 400 in FIG. 4 is essentially the same as coupler 200 of FIG. 2A except for the following differences. Instead of using ferrule 203 having embedded therein the ends of two optical fibers, ferrule 403 has embedded therein three or more optical fiber ends comprising the fiber end of the input optical fiber and the fiber ends of a plurality of output optical fibers exemplified by optical fibers 202 and 403. Instead of using a thin disk material 222, a disk material 422 is used which is relatively thick so that the Fresnel reflection at surface 423 of material 422 will be coupled to output fiber 403 whereas the Fresnel reflection at interface 242 is coupled to fiber 202. Obviously, additional interfaces may be added corresponding to the plurality of output fibers so that the Fresnel reflection from each additional interface may be coupled back to a corresponding output fiber in the same manner as that described above for the coupling of the reflection at interface 242 to fiber 202, and the coupling of the reflection at interface 423 to fiber 403. Preferably, material 422 is not less than 2 millimeters in thickness so that the Fresnel reflection from the interface at surface 423 may be coupled conveniently to a different optical fiber from the fiber to which the reflection from surface 242 is coupled. In general, in order to conveniently couple only the Fresnel reflection from one of the plurality of interfaces to a corresponding output fiber, such interface is separated from any other adjacent interface by at least 2 millimeters. Instead of using multiple output fibers to receive the Fresnel reflections from corresponding interfaces, it is also possible to use one (or more) movable optical fiber to collect the Fresnel reflection from one (or more) selected interface as desired.

While the invention has been described above by reference to various embodiments, it will be understood that changes and modifications may be made without departing from the scope of the invention which is to be defined only by the appended claims and their equivalents.

I claim:

1. An optical coupler comprising:
   a GRIN lens having an axis;
   a first optical medium adjacent to a surface of the GRIN lens, said first medium having an index of refraction that is different from that of the GRIN lens, so that a first interface is formed between the lens and said first medium;
   an input optical path substantially parallel to said axis incident on the GRIN lens at a distance from the axis, said path carrying an input optical signal, said lens transmitting the input optical signal in the input path towards the first interface, so that a portion of the input optical signal is reflected through Fresnel reflection by the first interface and another portion thereof is transmitted there through;
   a first output optical path receiving the portion of the signal reflected by the first interface which is substantially independent of wavelength of the input optical signal at the first interface; and
   a second output optical path receiving the portion of the signal transmitted through the first interface or any portion thereof.

2. The coupler of claim 1, further comprising a second optical medium adjacent to the first optical medium so that a second interface is formed between the first and second media, said second medium having an index of refraction that is different from that of the first medium, so that a portion of the input optical signal that is transmitted through the first interface is reflected through Fresnel reflection at the second interface which is substantially independent of wavelength of the input optical signal at the second interface, and the remaining portion of the input optical signal is transmitted through the second interface.

3. The coupler of claim 2, wherein the first medium is less than 2 mm in thickness, so that the signal reflected at the second interface is reflected towards the first output optical signal path.

4. The coupler of claim 2, said second medium being a disk of transparent material.

5. The coupler of claim 4, further comprising a tubing for holding the second medium to the lens.

6. The coupler of claim 2, said first medium including an optical cement, epoxy or air.

7. The coupler of claim 2, further comprising one or more additional optical media adjacent to the second optical medium and forming one or more additional interfaces, each of said additional media having an index of refraction that is different from that of the adjacent medium between it and the lens, so that a portion of the input optical signal that is transmitted through the second interface is reflected through Fresnel reflection at the additional interfaces which is substantially independent of wavelength of the input optical signal at the additional interfaces, and the remaining portion of the input optical is transmitted through the additional interfaces.

8. The coupler of claim 7, wherein the maximum separation between the first and the additional interfaces is less than 2 mm in thickness, so that the portion of the input optical signal reflected at the additional interfaces is reflected towards the second output optical signal path.

9. The coupler of claim 1, said GRIN lens collimating the input optical signal in the input path towards the first interface.

10. The coupler of claim 1, further comprising one or more additional optical media adjacent to the first optical medium and forming one or more additional interfaces, each of said additional media having an index of refraction that is different from that of the adjacent medium between it and the lens, so that a portion of the input optical signal that is transmitted through the first interface is reflected through Fresnel reflection at the additional interfaces wherein the separation between one of the first, and the additional interfaces and an interface adjacent to such one interface is not less than 2 mm in thickness, said first output optical path being positioned to receive a portion of the input optical signal reflected by such one interface and not portions of the input optical signal reflected by any other interface.

11. The coupler of claim 10, wherein the separation between any two adjacent interfaces is not less than 2 mm in thickness, said coupler further comprising a plurality of output optical paths each of which receives a portion of the input optical signal reflected from a corresponding interface.

12. A method for optical coupling, comprising the steps of:

providing a GRIN lens having an axis;

providing a first optical medium adjacent to a surface of the GRIN lens, said first medium having an index of refraction that is different from that of the GRIN lens, said first medium forming a first interface with the lens;

directing an input optical signal along an input optical path substantially parallel to said axis incident on the GRIN lens at a distance from the axis, said lens transmitting the input optical signal towards the first interface, causing a portion of the input optical signal to be reflected by the first interface which is substantially independent of wavelength of the input optical signal at the first interface, and another portion thereof to be transmitted there through;

receiving the portion of the signal reflected by the first interface; and receiving the portion of the signal transmitted through the first interface or any portion thereof.

13. The method of claim 12, further comprising:

providing one or more additional optical media adjacent to the first optical medium and forming one or more additional interfaces, each of said additional media having an index of refraction that is different from that of the adjacent medium between it and the lens;

causing a portion of the input optical signal that is transmitted through the first interface to be reflected at the additional interfaces which is substantially independent of wavelength of the input optical signal at the additional interfaces, and a portion thereof is transmitted through the additional interfaces; and moving an optical path to selectively receive a portion of the input optical signal reflected by a selected interface.

* * * * *